UNITED STATES PATENT OFFICE.

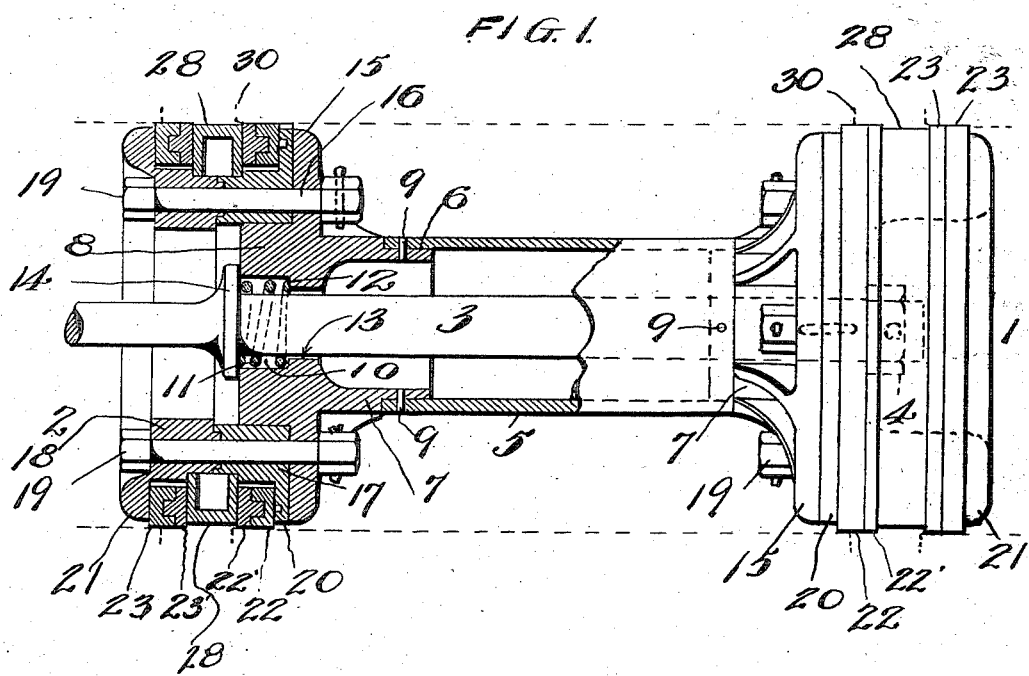

WILLIAM VICTOR SMITH, OF SCHENECTADY, NEW YORK.

VALVE.

1,036,923.　　　　Specification of Letters Patent.　　Patented Aug. 27, 1912.

Application filed March 16, 1912. Serial No. 684,289.

*To all whom it may concern:*

Be it known that I, WILLIAM VICTOR SMITH, a citizen of the United States, residing at Schenectady, in the county of Schenectady and State of New York, have invented certain new and useful Improvements in Valves, of which the following is a specification.

My invention relates to improvements in valves, and is intended especially to improve the construction of piston valves and pistons in certain particulars.

The object of the invention is the provision of a piston slide valve of this character which will maintain a steam tight joint about the packing rings; which is durable and efficient in operation, and a special advantage which might be mentioned is the facility with which the parts may be assembled or dismantled in case of repair, and the rings may be removed and replaced without the necessity of taking apart the entire valve.

Another meritorious feature of the invention resides in the construction whereby the valve in its travel is kept in alinement with the motion work of the engine to which the stem is connected, and the strain taken off the valve.

Other advantages and merits will appear hereinafter, and will be readily understood by those skilled in this art.

The invention consists in certain novel features of construction and combinations and arrangements of parts as hereinafter described and claimed.

In the accompanying drawings I have illustrated one example of the physical embodiment of my invention constructed as a piston slide valve according to the best mode I have so far devised for the practical application of the principles, but it will of course be understood that the invention may be embodied in standard pistons for different natures of engines, including internal combustion engines.

Referring to the drawings, Figure 1 is a view in side elevation of a piston valve embodying my invention, one end (the rear) being shown in section. Fig. 2 is a face view of a split or elastic grooved ring, or U-shaped packing ring. Fig. 3 is a face view of a complementary ribbed ring or T-shaped packing ring, also split and elastic and adapted to coöperate with the U-shaped ring. Fig. 4 is a vertical sectional view of the grooved ring. Fig. 5 is a vertical sectional view of the "bull" ring, and Fig. 6 is a vertical sectional view of the split ribbed ring.

In the preferred embodiment of my invention as illustrated in Fig. 1 the piston slide valve comprises the front head 1 and rear head 2, which are connected by means of the stem 3, and held together, directly, by means of the clamping nut 4 (dotted lines) in Fig. 1. The heads are also connected by a tubular member 5, which incases the stem between the two heads, and is seated at each end, in an annular recess 6, formed on a sleeve 7, which projects inwardly from each of the followers 8, and pins or rivets 9 secure the tube to the sleeves.

The followers 8 are each perforated to accommodate the stem 3, and at the left in Fig. 1 it will be observed that a chamber 10 is bored in the outer face of the follower, and a spring 11 is seated therein, which bears against the shoulder 12 of the bore 13, and also against the shoulder 14 on the stem 3. It will also be noted that the bore 13 is larger than the stem 3 in diameter and permits a slight play therein of the stem. The shoulder 14 of the stem 3 may be drawn, by means of the nut 4, against the spring 11, to clamp the two heads and hold them, while the loose fit of the stem within the bore 13 permits a slight play of parts, so that when lining up the valve, the strain is taken off the valve and link motion works of the engine. The spring is provided for the purpose of taking the strain off the valve when in motion, and for taking up the slight play between the stem and bore 13.

Each follower 8 is provided with packing mechanism or rings of identical construction, so that the description of one head and its rings will apply to both. Referring particularly to the head, shown in section, and at the rear, it will be seen that the follower is formed with an annular flange 15 perforated for the passage of bolts 16, and by means of these bolts the two sections 17 and 18 of the cage are held together and to the flange of the follower, nuts 19 being employed for clamping the parts rigidly together.

Each of the cage sections or open rings is formed with an outwardly projecting flange, as 20 and 21, and these flanges provide recessed annular seats for the grooved split, elastic packing rings 22 and 23 respectively.

Each grooved ring is provided with a complementary ribbed, split, elastic packing ring as 22' and 23' and the ribs 24 are adapted to fit within the grooves 25, dowel pins 26 in the bull ring 28 and holes 26' 27 being provided to insure close connection.

The bull ring 28, as shown is U-shaped in cross section and is formed with four radially extending ribs 29, and is located between the pairs of grooved and ribbed packing rings, as usual.

The ports of the valve mechanism are indicated in Fig. 1 by dotted lines as 30, and the front end shows the valve ready to receive steam, while the rear end shows the valve ready to exhaust the steam at the ports.

From the above description taken in connection with the drawings it will be understood that the packing rings will effectually prevent the escape of steam from the cylinder, and that the elastic rings as coupled in pairs will adjust themselves to continuous contact with the walls of the cylinder and to the edge of the ports.

The followers, which are metallic castings, carry the cages, the latter being bolted directly to the former, and it will be seen that the cage and packing rings may be removed and replaced with facility and without the necessity of removing the piston from the cylinder, or the stem from the piston, as is necessary in many valves now in use.

Having thus fully described my invention, what I claim, is:—

1. The combination with a pair of followers and a tube secured thereto and holding them in fixed relationship, of, a stem passed through the followers, a nut on one end of said stem, a chamber formed in the opposite follower, a spring in said chamber, and a shoulder formed on said stem bearing against said spring, the stem being loosely inclosed in the chambered follower.

2. In a piston valve, the combination with a pair of heads, each comprising a follower having an annular flange, flanged cage sections, packing rings carried by said cage sections, and bolts passed through said flange and sections, of a valve stem, and means for clamping the followers on the stem, and a sleeve surrounding the stem and holding the followers spaced apart.

3. In a piston valve, the combination with a pair of heads each comprising a follower having an annular flange, flanged cage sections and packing rings carried thereby, and bolts locking said flange and sections together, of a stem having a shoulder, a recess in one of the followers and a spring in said recess bearing on said shoulder, and a sleeve surrounding the stem and holding the followers spaced apart.

In testimony whereof I affix my signature in presence of two witnesses.

WILLIAM VICTOR SMITH.

Witnesses:
JAS. E. MORTON,
FELIX SCHEVERMER.